(12) United States Patent
Etchegoyen et al.

(10) Patent No.: US 10,360,555 B2
(45) Date of Patent: *Jul. 23, 2019

(54) NEAR FIELD AUTHENTICATION THROUGH COMMUNICATION OF ENCLOSED CONTENT SOUND WAVES

(71) Applicant: Uniloc 2017 LLC, Wilmington, DE (US)

(72) Inventors: Craig S. Etchegoyen, Newport Beach, CA (US); Dono Harjanto, Irvine, CA (US); Sean D. Burdick, Dallas, TX (US)

(73) Assignee: Uniloc 2017 LLC, Wilmington, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/057,441

(22) Filed: Aug. 7, 2018

(65) Prior Publication Data

US 2019/0019178 A1 Jan. 17, 2019

Related U.S. Application Data

(63) Continuation of application No. 15/424,298, filed on Feb. 3, 2017, now Pat. No. 10,068,224, which is a continuation of application No. 13/734,178, filed on Jan. 4, 2013, now Pat. No. 9,564,952.

(60) Provisional application No. 61/595,599, filed on Feb. 6, 2012.

(51) Int. Cl.
*H04B 7/00* (2006.01)
*G06Q 20/32* (2012.01)
*H04B 5/02* (2006.01)
*H04B 5/00* (2006.01)
*G06Q 20/40* (2012.01)

(52) U.S. Cl.
CPC ... *G06Q 20/3278* (2013.01); *G06Q 20/40145* (2013.01); *H04B 5/0031* (2013.01); *H04B 5/02* (2013.01)

(58) Field of Classification Search
CPC ...... H04B 1/034; H04B 1/205; H04B 5/0031; H04B 5/02; G06Q 20/3278; G06Q 20/40145; G06Q 10/10; G06Q 20/18; G06Q 20/208; G06Q 30/0251; G06Q 30/0266
USPC .......................................... 455/41.1; 705/44
See application file for complete search history.

(56) References Cited

U.S. PATENT DOCUMENTS

| | | | | |
|---|---|---|---|---|
| 5,019,813 A * | 5/1991 | Kip | ...................... | A01K 11/006 340/10.51 |
| 2004/0038716 A1* | 2/2004 | Gass | ...................... | H04B 1/034 455/569.1 |
| 2007/0198850 A1* | 8/2007 | Martin | ............... | G07C 9/00087 713/186 |

* cited by examiner

*Primary Examiner* — Ajibola A Akinyemi
(74) *Attorney, Agent, or Firm* — Sean D. Burdick (57) ABSTRACT

A method for near field authentication of sources using an audio transceiver computing device includes scanning a plurality of predetermined frequencies for a free frequency, selecting the free frequency from the plurality of predetermined frequencies, generating a periodic enclosed content message, generating a modulated carrier wave representing the periodic enclosed content message, and transmitting the modulated carrier wave at the free frequency. A method for near field authentication of sources using a microphone input of a receiving computing device includes scanning a plurality of predetermined frequencies to detect a signal using the microphone input, verifying, responsive to detecting the signal, that the signal includes at least one enclosed content message, and extracting a content from the enclosed content message.

24 Claims, 9 Drawing Sheets

NEAR FIELD AUTHENTICATION THROUGH COMMUNICATION OF ENCLOSED CONTENT SOUND WAVES

This application is a continuation of U.S. patent application Ser. No. 13/734,178, filed on Jan. 4, 2013, which is fully incorporated herein by reference. The benefit of such earlier filing dates is hereby claims by applicant under 35 U.S.C. § 120.

BACKGROUND OF THE INVENTION

1. Field of the Invention

The present invention relates generally to technology for near field authentication of users and their computing devices. More specifically, the invention relates to effecting near field authentication for digital communications by means of encoded sound waves.

2. Description of the Related Art

The use of a user's electronic device to complete a purchase has been suggested, for example, utilizing Bluetooth technology or a WiFi Internet connection to transmit the data to the register. However, such technology requires a transactional device such as a register or ATM machine to be upgraded and retrofitted with expensive equipment and software to securely receive the data and authenticate the user's electronic device. Thus, while it may be desirable for the user, it could be prohibitively expensive for the commercial entity utilizing the transactional device, especially for small businesses.

The use of other technology aside from the Internet or the Bluetooth may also require not only that the transactional device be upgraded and retrofitted, but also that the user's electronic device be similarly modified. In addition, alternative technology may also have range limitations which can degrade the user's experience when performing a transaction. For example, in a conventional near field communication, radio communication is utilized to facilitate transactions. However, the conventional near field communication requires that the two transacting devices be in extremely close proximity to each other, i.e., within about 4 centimeters from each other to ensure reliable communication. This requirement for close proximity places a very restrictive limitation on practical applications for near field transactions in the real world. If one of the transacting devices is a cash register, and the other transacting device is a customer's mobile phone, the customer would need to extend the phone to within centimeters of the register and risk dropping the phone. The proximity limitation may also prevent the user from making further use of the phone while the transaction is taking place and while the phone is extended away from the customer. For example, should complications in the transaction arise, or if the user is required to provide a manual input, the customer may not be able to complete the transaction.

Another drawback of the conventional near field communication is the lack of security, despite the close proximity of the two devices. That is, the conventional near field communication offers no protection against eavesdropping and can be vulnerable to data modifications. Needless to say, this is undesirable for financial transactions and other confidential communications.

Thus, there is a need for improved technology for effecting near field communications.

SUMMARY OF THE INVENTION

The present invention provides a method for source authentication in network communications. A source such as a mobile computing device transmits an authentication request by executing the following salient steps using an audio transceiver: scanning a plurality of predetermined frequencies for a free frequency, selecting the free frequency from the plurality of predetermined frequencies, generating a periodic enclosed content message, encoding a carrier wave with the periodic enclosed content message, and transmitting the modulated carrier wave at the free frequency. The audio transceiver, in one example, may be a mobile phone having both a speaker and a microphone.

The periodic enclosed content message includes an enclosed content message at each period. The enclosed content message comprises a beginning indication, a content, and an ending indication. The beginning indication indicates when the enclosed content message begins, while the ending indication indicates when the enclosed content ends. This allows for verification that the enclosed content message is completely instead of partially received. Furthermore, the content can include biometric data or device identification data, or both, which can be used to authenticate the user or the mobile computing device. Furthermore, the content may also include financial information for the user, or other data which might be used for gaining access to a secure network for facilitating a transaction once the user or the mobile computing device, or both, have been authenticated.

In another embodiment, the present invention includes a computer readable medium useful in association with an audio transceiving computing device that includes one or more processors and a memory, the computer readable medium including instructions configured to cause the audio transceiving computing device, by execution of the instructions in the one or more processors from the memory, to request authentication by executing the salient steps.

In another embodiment, the present invention includes a mobile computer system including at least one processor, a computer readable medium that is operatively coupled to the processor, and a transmission logic that (i) executes in the processor from the computer readable medium and (ii) when executed by the processor causes the mobile computer system to request authentication by executing the salient steps.

The invention also provides a method for receiving an authentication request using an audio or microphone input of a receiving computing device by executing the following second set of salient steps: scanning a plurality of predetermined frequencies to detect a signal using the microphone input, verifying, responsive to detecting the signal, that the signal includes at least one enclosed content message, and extracting a content from the enclosed content message.

Another embodiment of the invention comprises a computer readable medium useful in association with an audio receiving computing device that includes one or more processors, an audio or microphone input, and a memory, the computer readable medium including computer instructions which are configured to cause the audio receiving computing device, by execution of the computer instructions in the one or more processors from the memory, to receive an authentication request by execution of the second set of salient steps.

In another embodiment, a present invention is a computer system including at least one processor, an audio input that is operatively coupled to the processor, a computer readable medium that is operatively coupled to the processor, and a near field authentication receiver logic that (i) executes in the processor from the computer readable medium and (ii) when executed by the processor causes the computer system to receive an authentication request via the audio input by execution of the second set of salient steps.

In an embodiment, the near field authentication of sources using audio waves can be used in conjunction with a conventional online transaction to provide enhanced security for transactions, such as payments and electronic or personal access to confidential files or secure locations.

BRIEF DESCRIPTION OF THE DRAWINGS

Other systems, methods, features and advantages of the invention will be or will become apparent to one with skill in the art upon examination of the following figures and detailed description. It is intended that all such additional systems, methods, features and advantages be included within this description, be within the scope of the invention, and be protected by the accompanying claims. Component parts shown in the drawings are not necessarily to scale, and may be exaggerated to better illustrate the important features of the invention. In the drawings, like reference numerals may designate like parts throughout the different views, wherein:

DETAILED DESCRIPTION

The present invention relates to a method and system for near field authentication of users and computing devices using sound waves. Such users and computing devices may be referred to collectively herein as "sources". Authenticating a source according to the present invention may involve authenticating only a user, only a computing device, or both a user and a computing device.

Figure 1:
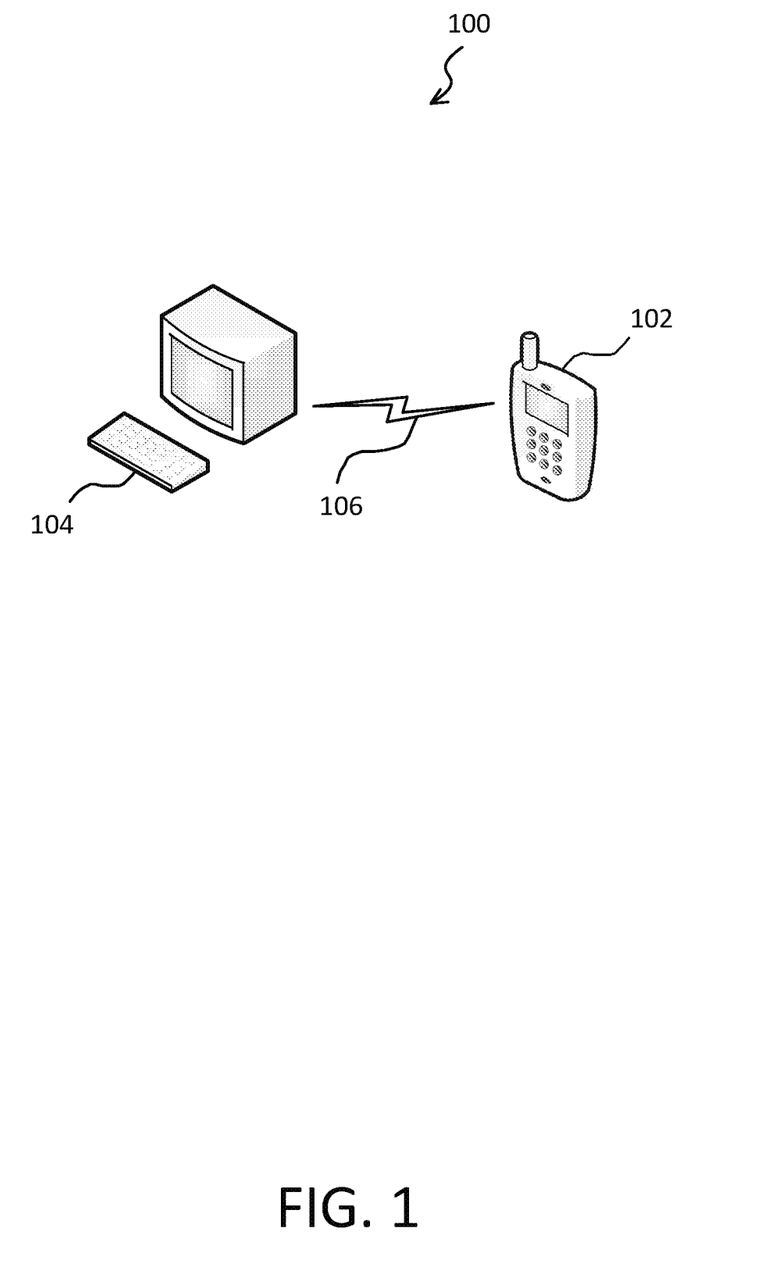
FIG. 1 is a block diagram showing an audio transceiving computing device transmitting data to an audio receiving computing device in accordance with one embodiment of the present invention.

As seen in FIG. 1, a system 100 for authenticating sources using sounds waves can include, for example, an audio transceiving computing device 102, and an audio receiving computing device 104. The audio transceiving computing device 102 can transmit data to the audio receiving computing device 104 as a modulated carrier wave 106. The modulated carrier wave 106 can be, for example, a sound wave. Sound waves can transmit information accurately over a very short distance (near field communications) using inexpensive equipment. In different embodiments, the sound wave can have a frequency that is substantially below, within, or above the audible frequencies, such as below 20 Hz, between 20 Hz and 20 kHz, or above 20 kHz. For example, the sound wave could be an ultrasonic wave.

Figure 2:
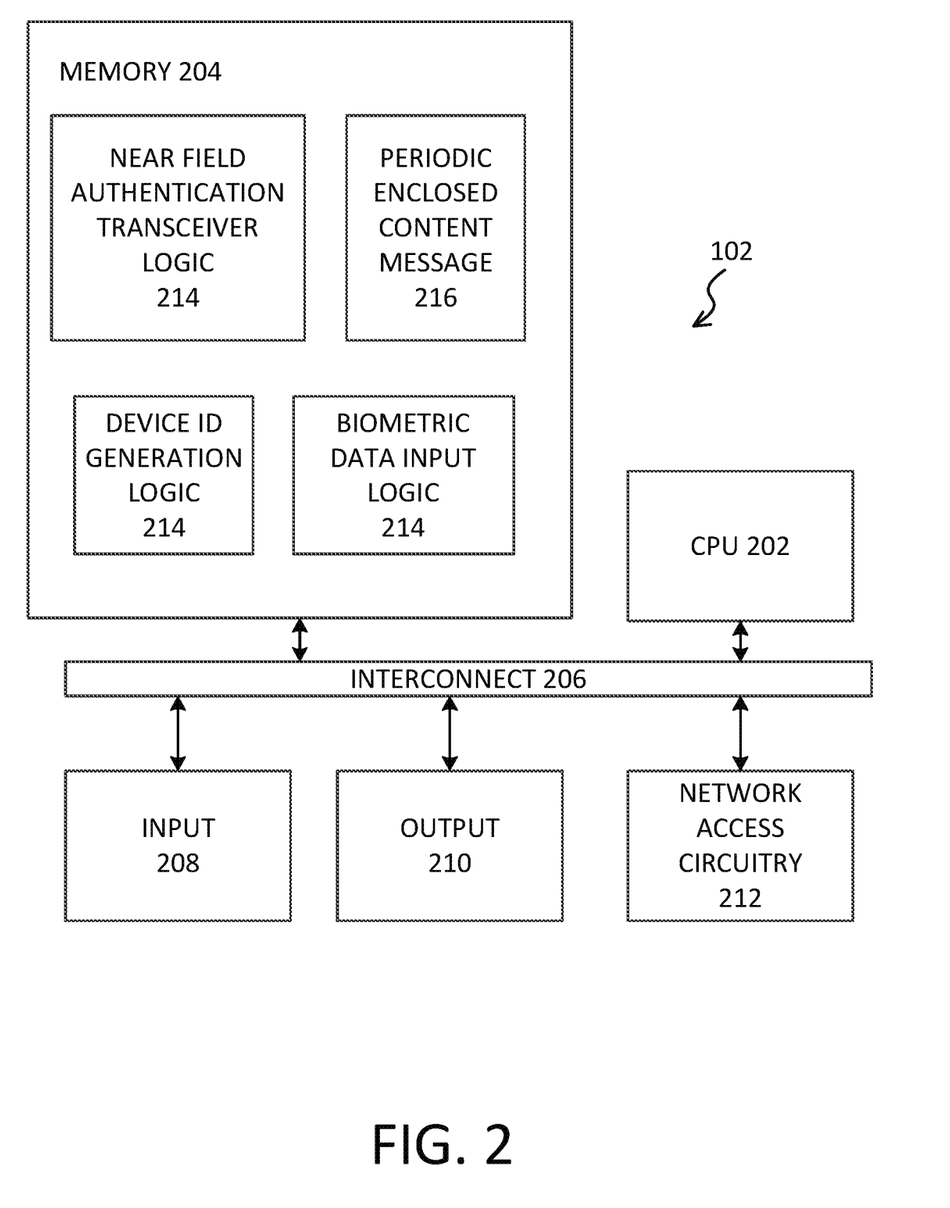
FIG. 2 is a block diagram showing functional components that make up an audio transceiving computing device according to an embodiment of the present invention.

The audio transceiver computing device 102 can be, for example, a mobile phone, a personal digital assistant, a tablet, a laptop, a music player, or any other device having a processor operatively coupled to memory and capable of transmitting the modulated carrier wave 106 responsive to operation of the processor. As seen in FIG. 2, the audio transceiver computing device 102 can include, for example one or more microprocessors, which are collectively shown as CPU 202. The audio transceiver computing device 102 also includes, for example, a memory 204, an interconnect 206, an input 208, an output 210, and/or a network access circuitry 212. The CPU 202 can retrieve data and/or instructions from the memory 204 and execute the retrieved instructions. The memory 204 can include generally any computer-readable medium including, for example, persistent memory such as magnetic and/or optical disks, ROM, and PROM and volatile memory such as RAM.

The CPU 202 and the memory 204 are connected to one another through the interconnect 206, which is a bus in this illustrative embodiment. The interconnect 206 connects the CPU 202 and the memory 204 to the input devices 208, the output devices 210, and the network access circuitry 212. The input devices 208 can include, for example, a keyboard, a keypad, a touch-sensitive screen, a mouse, a microphone, and/or one or more cameras. The output devices 210 can include, for example, a display—such as a liquid crystal display (LCD)—and/or one or more speakers. The network access circuitry 212 sends and receives data through computer networks such an intranet or the Internet.

A number of components of the audio transceiver computing device 102 are stored in the memory 204. In particular, a near field authentication transceiver logic 214 is part of one or more computer processes executed within the CPU 202 from the memory 204 in this illustrative embodiment, but can also be implemented using digital logic circuitry. As used herein, "logic" refers to (i) logic implemented as computer instructions and/or data within one or more computer processes and/or (ii) logic implemented in electronic circuitry.

In an embodiment, the near field authentication transceiver logic 214 is executable software stored within the memory 204. For example, when the audio transmitting computing device 102 receives a request from the user to transmit the modulated carrier wave 106, the audio transceiver computing device 102 executes the near field authentication transceiver logic 214 to transmit the modulated carrier wave 106 to the audio receiving computing device 104. As previously noted the modulate carrier wave 106 can be an analog signal, such as a sound signal. Advantageously, an analog signal has an infinite amount of signal resolution. Furthermore, the use of sound signals increases the permissible transmission distance. That is, the theoretical and practical working distance for completing a transaction using the present invention is increased and can be measured, for example, in feet or meters instead of centimeters. This allows the user to utilize the audio transceiver computing device 102 for additional functions simultaneously while completing a transaction. It also reduces a likelihood that the user will be prone to dropping or otherwise damaging the audio transceiver computing device 102 by moving the audio transceiver computing device 102 into very close proximity with the audio receiving computing device 104.

When the near field authentication transceiver logic 214 is executed, the audio transceiver computing device 102 scans a plurality of predetermined frequencies for a free frequency. The predetermined frequencies can be, for example, frequencies for which the audio transceiver computing device 102 is authorized to transmit the modulated carrier wave or which are known to the audio receiving computing device 104. In an embodiment, the predetermined frequencies can be selected to be outside the audible frequencies. From the predetermined frequencies, the near field authentication transceiver logic 214 can select a free frequency. The free frequency can be, for example, a frequency which has a noise level below a predetermined noise level threshold or a frequency that has an interference level below a predetermined interference level threshold.

The near field authentication transceiver logic 214 can also generate a periodic enclosed content message 216 as shown in FIG. 2. To generate the periodic enclosed content message 216, the near field authentication transceiver logic 214 can utilize a device ID generation logic 218 or a biometric data input logic 220, or both. The device ID generation logic 218 can generate, for example, device identification data of the audio transceiver computing device 102. In an embodiment, the device ID generation logic 218 can utilize known techniques for generating a device fingerprint. The biometric data input logic 220 can display, for example, a user interface for requesting and receiving a voice or image input representing biometric data. The device identification data or the biometric data, or both, can be included in a content of the periodic enclosed content message 216, which will be described later.

The near field authentication transceiver logic 214 can also generate a modulated carrier wave 106 representing the periodic enclosed content message. The modulated carrier wave 106 can be transmitted at the free frequency to the audio receiving computing device 104. Preferably, the periodic enclosed content message is generated initially in digital format, and is then converted into an analog signal and used to modulate the carrier wave. In an embodiment, the digital form of the periodic enclosed content message 216 can be encrypted using standard RSA (PKI) keys. Key exchanges may occur out-of-band, such as during registration of the audio transceiver computing device 102, or may be built-in to the near field authentication transceiver logic 214.

Figure 3:
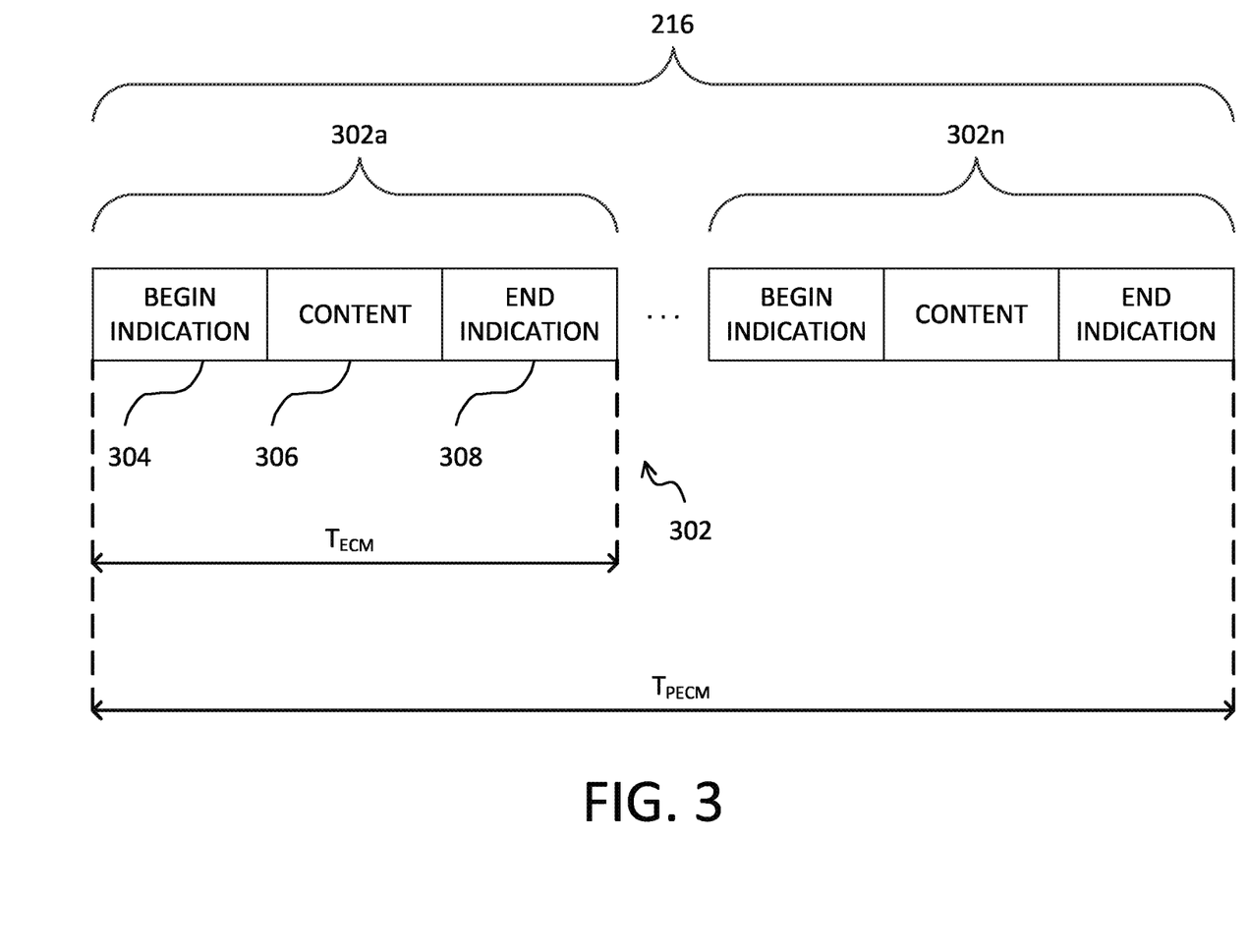
FIG. 3 depicts a periodic enclosed content message according to an embodiment of the present invention.

As can be seen in FIG. 3, the periodic enclosed content message 216 includes, for example, multiple periods with each period including an enclosed content message 302. Thus, the periodic enclosed content message 216 includes a plurality of enclosed content messages 302 such as enclosed content messages 302a-302n for a total of N enclosed content messages. Each of the enclosed content messages includes a begin indication 304, a content 306, and an end indication 308. The begin indication 304 can be any type of signal that uniquely indicates the beginning of the enclosed content message, for example, a specified sequence of binary bits. Similarly, the end indication 308 can be any type of signal that indicates the ending of the enclosed content message. In one embodiment, the begin indication 304 and the end indication 308 comprise different signals. In another embodiment, the begin indication 304 and the end indication 308 comprise identical signals, i.e. two of the same signals in sequence. In another embodiment, an end indication 308(n−1) and the next begin indication 304(n) may be one and the same signal.

Figure 4:
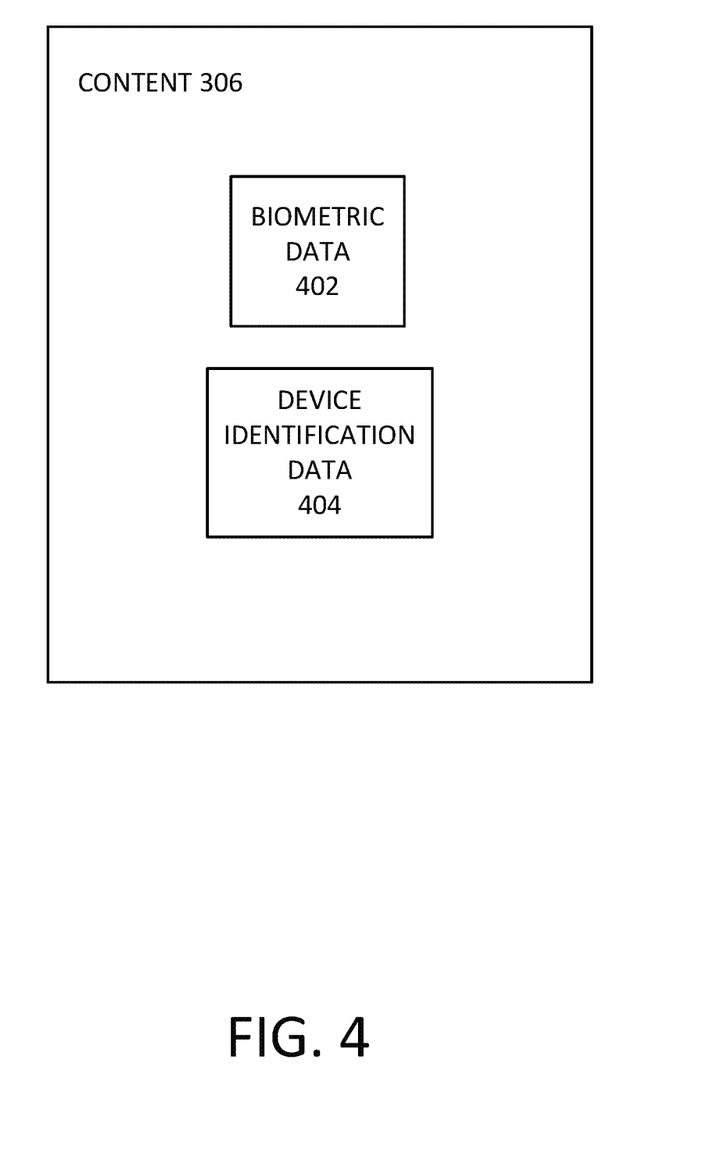
FIG. 4 is a block diagram depicting message content in an enclosed content message according to an embodiment of the present invention.

Referring to FIG. 4, the content 306 can include, for example, biometric data 402 or a device identification data 404 or a combination of both. The biometric data 402 can include, for example, the data corresponding to a voice of a user, a fingerprint of the user, an image of the user, or any other physiological data of the user which can be used to verify an identity of the user. The device identification data 404 can include, for example, a MAC address of the audio transceiver computing device 102, a hard disk serial number of the audio transceiver computing device 102, a device ID number of the audio transceiver computing device 102, a device phone number of the audio transceiver computing device 102, a device fingerprint of the audio transceiver computing device 102, or any other information which could be used to identify and verify the authenticity of the audio transceiver computing device 102.

A device fingerprint comprises binary data that identifies the audio transceiver computing device 102 by deriving a unique data string from multiple portions of indicia stored in memory locations within the device, where such indicia can include, for example, data representing a manufacture name, a model name, or a device type. Device fingerprints and generation thereof are known and are described, e.g., in U.S. Pat. No. 5,490,216 (sometimes referred to herein as the '216 patent), and in related U.S. Patent Application Publications 2007/0143073, 2007/0126550, 2011/0093920, and 2011/0093701 (the "related applications"), the descriptions of which are fully incorporated herein by reference.

In general, the device fingerprint comprises a bit string or bit array that includes or is derived from user-configurable and non-user-configurable data specific to the audio transceiver computing device 102. Non-user-configurable data includes data such as hardware component model numbers, serial numbers, and version numbers, and hardware component parameters such as processor speed, voltage, current, signaling, and clock specifications. User-configurable data includes data such as registry entries, application usage data, file list information, and MAC address. In an embodiment, the audio transceiver computing device 102 can also include, for example, manufacture name, model name, and/or device type of the audio transceiver computing device 102.

Generation of the device fingerprint includes a combination of operations on the data specific to the audio transceiver computing device 102, which may include processing using a combination of sampling, concatenating, appending (for example, with a nonce value or a random number), obfuscating, hashing, encryption, and/or randomization algorithms to achieve a desired degree of uniqueness. For example, the desired degree of uniqueness may be set to a practical level such as 99.999999% or higher, to achieve a probability of less than 1 in 100,000,000 that any two of the audio transceiver computing devices will generate identical fingerprints. In an embodiment, the desired degree of uniqueness may be such that the device fingerprint generated is unlike any other device fingerprint generatable responsive to a request to transmit the modulated carrier wave 106 to the audio receiving computing device 104.

In one embodiment, the device fingerprint may be stored in volatile memory and erased after transmission of the modulated carrier wave 106 to the audio receiving computing device 104. In another embodiment, the device fingerprint may be stored in persistent memory and written over each time a new fingerprint is generated by the device ID generation logic 218.

Referring back to FIG. 3, the amount of time it takes to transmit the modulated carrier wave 106 representing the periodic enclosed content message, $T_{PECM}$, can be a sum of the time it takes to transmit a modulated carrier wave representing each of the enclosed content messages 302 in the periodic enclosed content message 216. For example, the time it takes to transmit each of the modulated carrier waves representing an enclosed content message 302 can be $T_{ECM}$. Thus, the amount of time it takes to transmit the modulated carrier wave 106 $T_{PECM}$ can be, for example, represented by the equation $T_{PECM} = N \times T_{ECM}$ where N represents the total number of enclosed content messages 302 in the periodic enclosed content message 216.

The total number N of enclosed content messages 302 in the periodic enclosed content messages 216 can be a function of the total number of frequencies in the plurality of predetermined frequencies. That is, the total number N of enclosed content messages 302 should be sufficient such that the audio receiving computing device 104 can scan through the predetermined frequencies to determine the free frequency on which the modulated carrier wave 106 is transmitted, and have time enough to receive at least one of the enclosed content messages 302. This will be discussed in more detail below. In an embodiment, the near field authentication transceiver logic 214 can transmit the modulated carrier wave 106 for a predetermined number of periods, or a predetermined period of time. In another embodiment, the near field authentication transceiver logic 214 can transmit the modulated carrier wave 106 until a stop indication is received from the user. Such indication can come, for example, from the input 208 in the form of a button depression, a tap on a screen, a vocal indication, or any other type of indication from the user to stop transmission of the modulated carrier wave 106.

In an embodiment, the near field authentication transceiver logic 214 using the biometric data input logic 220 can display a user interface on the output 210 when the output 210 is, for example, a display screen. The user interface can request the biometric data 402 from the user. For example, the user interface can prompt the user for voice input to be newly received by the biometric data input logic 220 and subsequently the near field authentication transceiver logic 214 through a microphone input on the audio transceiver computing device 102. A characteristic voice print in digital form may be derived from the voice input using technology known in the art. In another example, the user interface can prompt the user for photographic input, such as the user's face or biometric fingerprint using a camera or scanning device on the audio transceiving computing device 102. A digital representation of the facial image or biometric fingerprint may be derived using technology known in the art. Responsive to receiving the biometric data 402, the near field authentication transceiver logic 214 can generate the periodic enclosed content message 216, wherein the content 306 in each period of the periodic enclosed content message 216 includes the biometric data (or a derivation thereof) 402.

Figure 5:
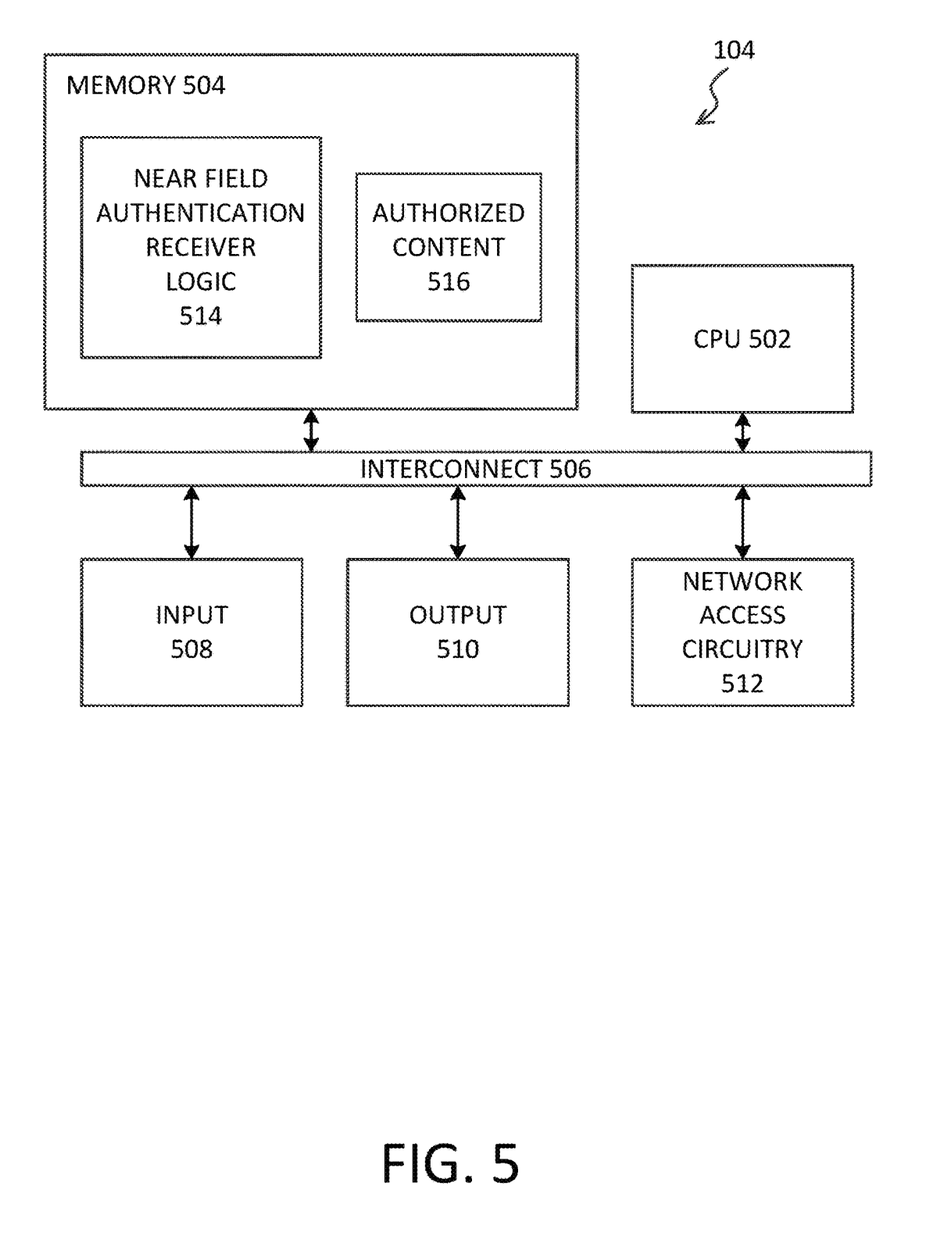
FIG. 5 is a block diagram showing functional components of an audio receiving computing device according to an embodiment of the present invention.

Referring to FIGS. 1 and 5, the audio receiving computing device 104 can be, for example, a register, an ATM machine, a kiosk, a mobile phone, a personal digital assistant, a tablet, a laptop, a music player, or any other device capable of receiving the modulated carrier wave 106. As seen in FIG. 5, the audio receiving computing device 104 can include, for example one or more microprocessors, which are collectively shown as CPU 502. The audio receiving computing device 104 also includes, for example, a memory 504, an interconnect 506, an input 508, an output 510, and/or a network access circuitry 512. The CPU 502 can retrieve data or instructions from the memory 504 and execute the retrieved instructions. The memory 504 can include generally any computer-readable medium including, for example, persistent memory such as magnetic or optical disks, ROM, and PROM and volatile memory such as RAM.

The CPU 502 and the memory 504 are connected to one another through an interconnect 506, which is a bus in this illustrative embodiment. The interconnect 506 connects the CPU 502 and the memory 504 to the input devices 508, the output devices 510, and the network access circuitry 512. The input devices 508 can include, for example, a keyboard, a keypad, a touch-sensitive screen, a mouse, a microphone, and/or one or more cameras. The output devices 510 can include, for example, a display—such as a liquid crystal display (LCD)—or one or more loudspeakers. The network access circuitry 512 sends and receives data through computer networks such an intranet or the Internet.

A number of components of the audio receiving computing device 104 are stored in the memory 504. In particular, a near field authentication receiver logic 514 is part of one or more computer processes executed within CPU 502 from memory 504 in this illustrative embodiment, but can also be implemented using digital logic circuitry.

In an embodiment, the near field authentication receiver logic 514 is executable software stored within the memory 504. For example, the near field authentication receiver logic 514 can receive signals such as the modulated carrier wave 106 to verify the authenticity of the audio transceiver computing device 102.

When the near field authentication receiver logic 514 is executed, it scans a plurality of predetermined frequencies to detect a signal using the microphone disclosed as the input 508. In an embodiment, the signal is a sound wave. In another embodiment, the microphone may be a specialized band-pass microphone that is mechanically configured or otherwise designed to receive frequencies within the range of the predetermined frequencies. Such a microphone may be tuned, for example, to receive only ultrasonic frequencies of interest, and attenuate all frequencies outside the desired range. Such a microphone may be designed to plug in to the audio receiving computing device 104 through a standard audio input such as TRS or USB.

In an embodiment, the near field authentication receiver logic 514 scans each of the frequencies in the predetermined frequencies for a predetermined scanning period of time. The predetermined scanning period of time at each frequency, $T_{SCAN}$, is equal to at least twice the time $T_{ECM}$, which is the time it takes to transmit each period of the modulated carrier wave representing the enclosed content message 302. This ensures that the near field authentication receiver logic 514 has the opportunity to receive the complete enclosed content message instead of a partial enclosed content message.

That is, the enclosed content message 302 should include the begin indication 304, the content 306, and the end indication 308. In some embodiments, however, only the begin indication 304 and the end indication 308 need be detected by the near field authentication receiver logic 514 in order for the near field authentication receiver logic 514 to consider the enclosed content message 302 to be a complete enclosed content message. Otherwise, if the enclosed content message 302 is missing, for example, the begin indication 304 or the end indication 308, it is not considered a complete enclosed content message, and instead is considered a partial enclosed content message.

However, the predetermined scanning period of time $T_{SCAN}$ may also include an additional period of time $K_{ECM}$ to compensate for any delays or lag. Thus, the predetermined scanning period of time at each frequency may be represented as $T_{SCAN}=2\times T_{ECM}+K_{ECM}$. If there are F predetermined frequencies, then the minimum amount of time spent scanning the predetermined frequencies, $T_{MIN\ TOTAL\ SCAN}$, will be represented by the equation $T_{MIN\ TOTAL\ SCAN}=F\times(T_{SCAN})$.

Since the near field authentication receiver logic 514 will spend at least a $T_{MIN\ TOTAL\ SCAN}$ time period scanning the predetermined frequencies, the near field authentication transceiver logic 214 should transmit the modulated carrier wave for at least a $T_{MIN\ TOTAL\ SCAN}$ time period. Thus, the amount of time it takes to transmit the modulated carrier wave 106 representing the periodic enclosed content message, $T_{PECM}$, should be equal to or greater than the $T_{MIN\ TOTAL\ SCAN}$ time period. However, $T_{PECM}=N\times T_{ECM}$. Therefore, $T_{MIN\ TOTAL\ SCAN}=N\times T_{ECM}$. Thus, the total number of enclosed content messages 302 in the periodic enclosed content message 216 (N) is represented by the equation $N=T_{MIN\ TOTAL\ SCAN}/T_{ECM}$. Substituting for $T_{MIN\ TOTAL\ SCAN}$ yields $N=F\times(T_{SCAN})/T_{ECM}$. We can also replace $T_{SCAN}$ such that we get $N=[F\times(2\times T_{ECM}+K_{ECM})]/T_{ECM}$ or more succinctly, $N=2\times F+(F\times K_{ECM})/T_{ECM}$.

Thus, at a minimum the number of enclosed content messages (N) should be equal to twice the number of frequencies in the frequency period (F) plus some additional number of enclosed content messages with a minimum number of $(F\times K_{ECM}/T_{ECM})$. For convenience, $K_{ECM}$ may be expressed in integral multiples of $T_{ECM}$, so that N results in an integer value. The additional number of enclosed content messages $(F\times K_{ECM}/T_{ECM})$ can be selected to be sufficiently large to allow for any latency in execution of the near field authentication receiver logic 514, or switching between frequencies by the near field authentication receiver logic 514.

Referring back to FIG. 5, responsive to detecting the signal, the near field authentication receiver logic 514 can verify that the signal includes at least one enclosed content message. The enclosed content message should be a complete enclosed content message, instead of a partial enclosed content message. Partial enclosed content messages are discarded. In one embodiment, the near field authentication receiver logic 514 can stop scanning the predetermined frequencies once a signal is detected, or when the signal is verified to include at least one enclosed content message.

In an embodiment, the near field authentication receiver logic 514 can extract a content from the enclosed content message. Such extraction can occur through demodulation, A/D conversion, decryption, decoding, deciphering, descrambling, or any other methods needed to recover the original content so that it is recognizable and useable by the near field authentication receiver logic 514. Furthermore, when keys are used for decryption of the content, standard RSA (PKI) keys can be used. Key exchanges may occur out-of-band, such as during registration of the audio receiving computing device 104, or built-in to the near field authentication receiver logic 514.

In an embodiment, the near field authentication receiver logic 514 can also compare the extracted content to an authorized content 516. The authorized content 516 can include, for example, authenticated biometric data or authenticated device identification data, or both. The authenticated biometric data and authenticated device identification data can be, respectively, biometric data and device identification data that the user of the transceiver computing device 102 has registered beforehand as being authentic.

The near field authentication receiver logic 514 can determine if there is a match between the extracted content and the authorized content 516 to authenticate the audio transceiver computing device 102. In FIG. 5, the authorized content 516 is stored in the memory 504. However, the authorized content 516 could also be kept in other storage devices which have a database or memory accessible by the audio receiving computing device 104. In one embodiment, the near field authentication receiver logic 514 can stop scanning the predetermined frequencies when the audio transceiver computing device 102 has been authenticated.

In an embodiment, when the audio transceiver computing device 102 is authenticated, the near field authentication receiver logic 514 can, for example, perform a financial transaction based on the content. In such a case, the content can include, for example, financial data such as a credit card number, a bank account number, or other data needed to complete a financial transaction. Of course additional functions could also be performed by the near field authentication receiver logic 514 once the audio transceiver computing device 102 is authenticated, such as ticket verification, entry into a restricted area, or any other type of function which would require authentication of the audio transceiver computing device 102, its user, or both.

Once the near field authentication receiver logic 514 authenticates the audio transceiver computing device 102, the near field authentication receiver logic 514 can display or provide a an acknowledgement indication that the authentication has occurred. The acknowledgement indication may be provided locally by the device 104, for example, in the form of a visual indication or an audible tone. Alternatively or in combination, the acknowledgement indication may also be provided to the user of the device 102 by means of a locally generated audible tone, locally generated visual indication (such as an LED illuminating or changing color), or by sending a remote indication to the device 102 via a network link or by means of a sound wave using a free frequency according to the same methods disclosed herein for generating and transmitting the enclosed content message. The user of device 102, responsive to receiving the indication, may then stop transmission of the modulated carrier wave 106 by manual or automatic action. However, if the near field authentication receiver logic 514 fails to authenticate the audio transceiver computing device 102, such as if the content does not match the authorized content 516, or if no content was discovered, then the near field authentication receiver logic 514 can display or provide some sort of indication to indicate that an authentication failure has occurred. Furthermore, a log could be stored indicating the time, location, and/or the content if available. This can help with any troubleshooting requests, and/or any investigations of fraud.

In one implementation of an acknowledgment indication, the device 104 may scan for a free frequency from among the plurality of predetermined frequencies until one is found, or it may transmit acknowledgements on a special predetermined frequency that is reserved only for transmitting such acknowledgements. In an acknowledgement message so transmitted, device 104 may include acknowledgement content in the form of a special binary code that is recognized by transceiver logic 214 within device 102 as an acknowledgement signal, and it may also include a device identifier of either or both of devices 102 and 104. In such case, device 104 may also include its own device identifier (not shown) stored in local memory 504 and recognizable by transceiver logic 214.

Figure 6:
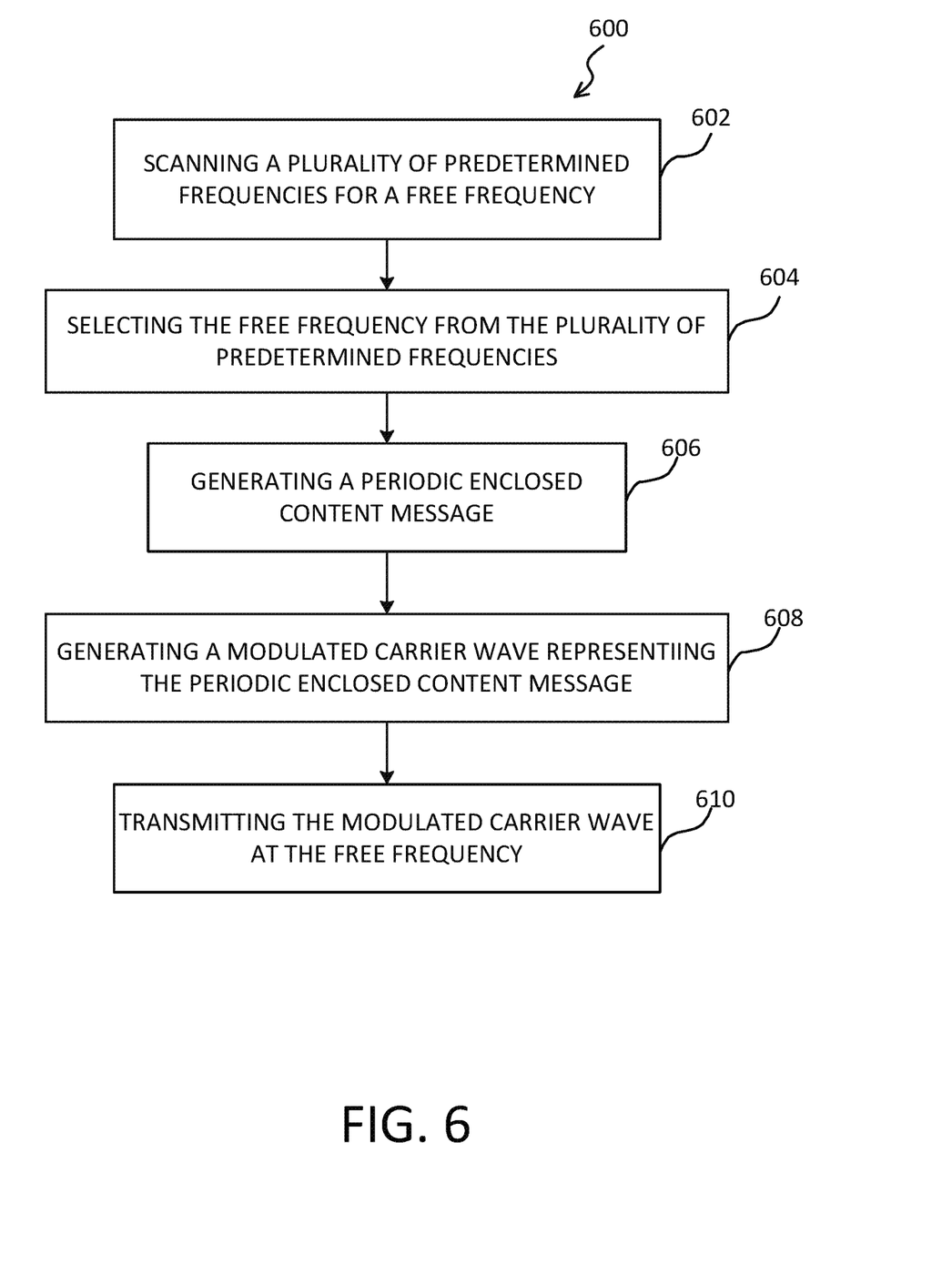
FIG. 6 is a process flow diagram showing steps for an audio transceiving computing device to request authentication from an audio receiving computing device according to an embodiment of the present invention.

In an embodiment, a transaction flow diagram 600 as shown in FIG. 6 illustrates a near field authentication of sources to an audio receiving computing device 104 using an audio transceiver computing device 102. To facilitate appreciation and understanding of the invention, transaction flow diagram 600 is described in the context of an illustrative example of a user seeking to purchase a product at a register using his mobile phone. Of course the near field authentication of sources could occur for other transactions.

In step 602, the audio transceiver computing device 102 scans a plurality of predetermined frequencies for a free frequency. For example, the mobile phone through its microphone can scan a plurality of predetermined frequencies for a free frequency.

In step 604, the audio transceiver computing device 102 selects the free frequency from the plurality of predetermined frequencies. For example, the mobile phone can identify the first free frequency it scans that has no discernable signal, or that has no signal strength that satisfies a minimum amplitude threshold, or that otherwise meets a pre-established criteria for being a free frequency.

In step 606, the audio transceiver computing device 102 generates a periodic enclosed content message. For example, the mobile phone can generate the periodic enclosed content message by representing one or more of user biometric data, device identification data, and the user's credit card information in binary form.

In step 608, the audio transceiver computing device 102 generates a modulated carrier wave representing the periodic enclosed content message. For example, the mobile phone can generate a carrier wave and modulate the carrier wave using the periodic enclosed content message. Amplitude, frequency, or phase modulation may be used.

In step 610, the audio transceiver computing device 102 transmits the modulated carrier wave at the free frequency. For example, the mobile phone can transmit the modulated carrier wave at the free frequency through its output speaker in a directional or omnidirectional broadcast.

Thus, the user need not use a credit card to purchase the product. Instead, the user can use a device such as a mobile phone that can store credit card information. Furthermore, the mobile phone need not have its physical components modified with expensive equipment, but can use the speaker already included in the mobile phone. Thus, the user can complete the transaction using sound waves. In addition, the mobile phone need not be adjacent the register. Therefore, the user does not need to extend his arm to place the mobile phone adjacent the register, but instead can safely hold the mobile phone in a more comfortable and secure position. Furthermore, the user can also simultaneously perform other actions on the phone while the transaction is occurring, which would not be possible if the user had to extend his arm to place the phone adjacent the register. Should any issues arise in the transaction, the user can more easily troubleshoot the issue because the user is able to manipulate the mobile phone.

Figure 7:
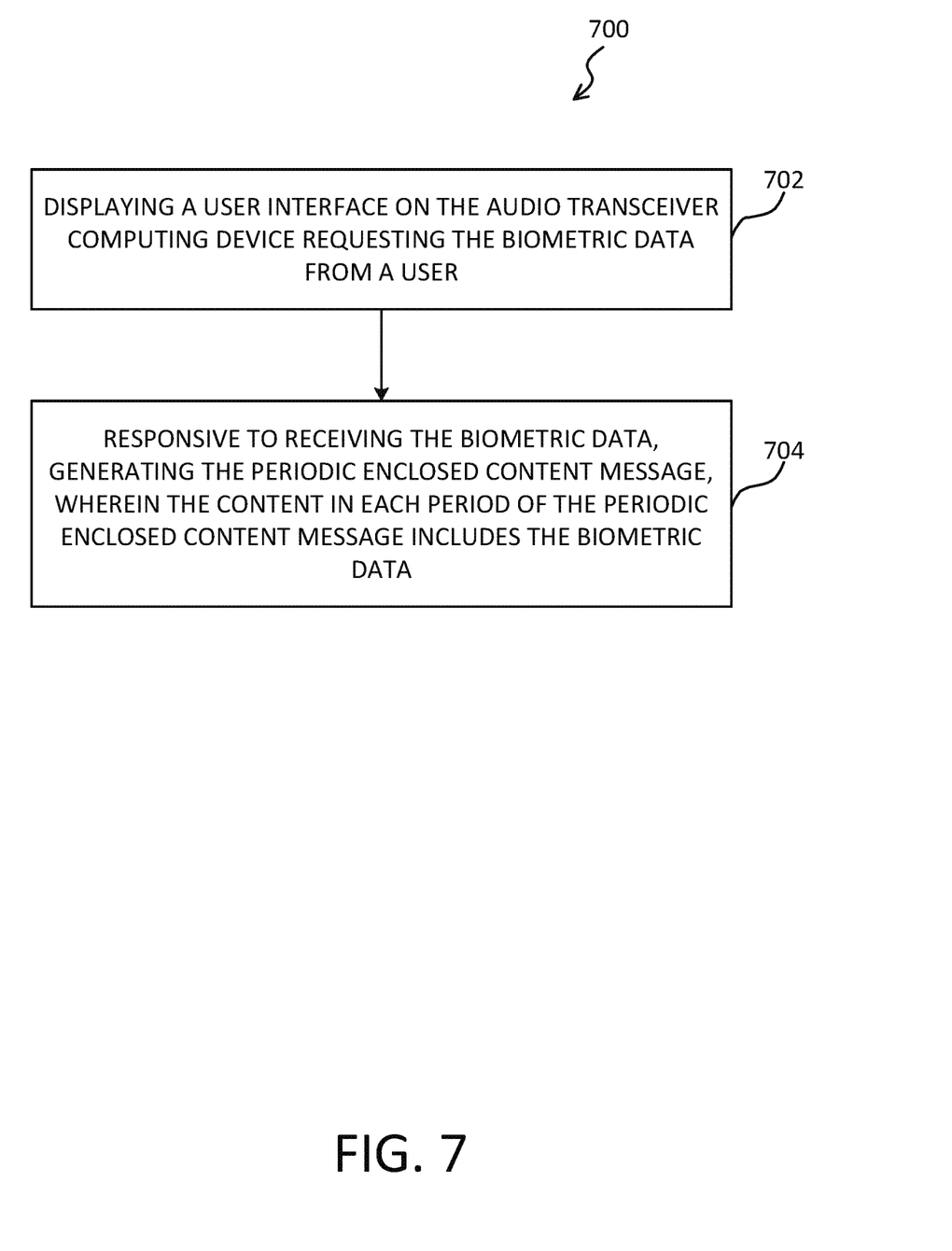
FIG. 7 depicts additional process steps for inputting content for an enclosed content message into an audio transceiving computing device in advance of requesting authentication according to an embodiment of the present invention.

In an embodiment, a transaction flow diagram 700 as shown in FIG. 7 illustrates additional steps to the transactional flow diagram 600 (FIG. 6), in which there is a near field authentication of sources associated with an audio transceiver computing device 102 by an audio receiving computing device 104.

In step 702, a user interface is displayed on the audio transceiver computing device 102 requesting biometric data from the user. For example, a user interface can be displayed on a screen of the mobile phone. The user interface can request the biometric data such as a voice recording of the user, to be received by means of biometric data input logic operating within the mobile phone when the user speaks a requested word or phrase into a microphone on the mobile phone.

In step 704, responsive to receiving the biometric data, the audio transceiver computing device 102 generates the periodic enclosed content message, wherein the content in each period of the periodic enclosed content message includes the biometric data. For example, responsive to receiving voice data corresponding to a voice of the user, near field authentication transceiver logic operating within the mobile phone generates the periodic enclosed content message, wherein the content in each period of the periodic enclosed content message includes a digital representation of the voice data corresponding to the voice of the user.

Figure 8:
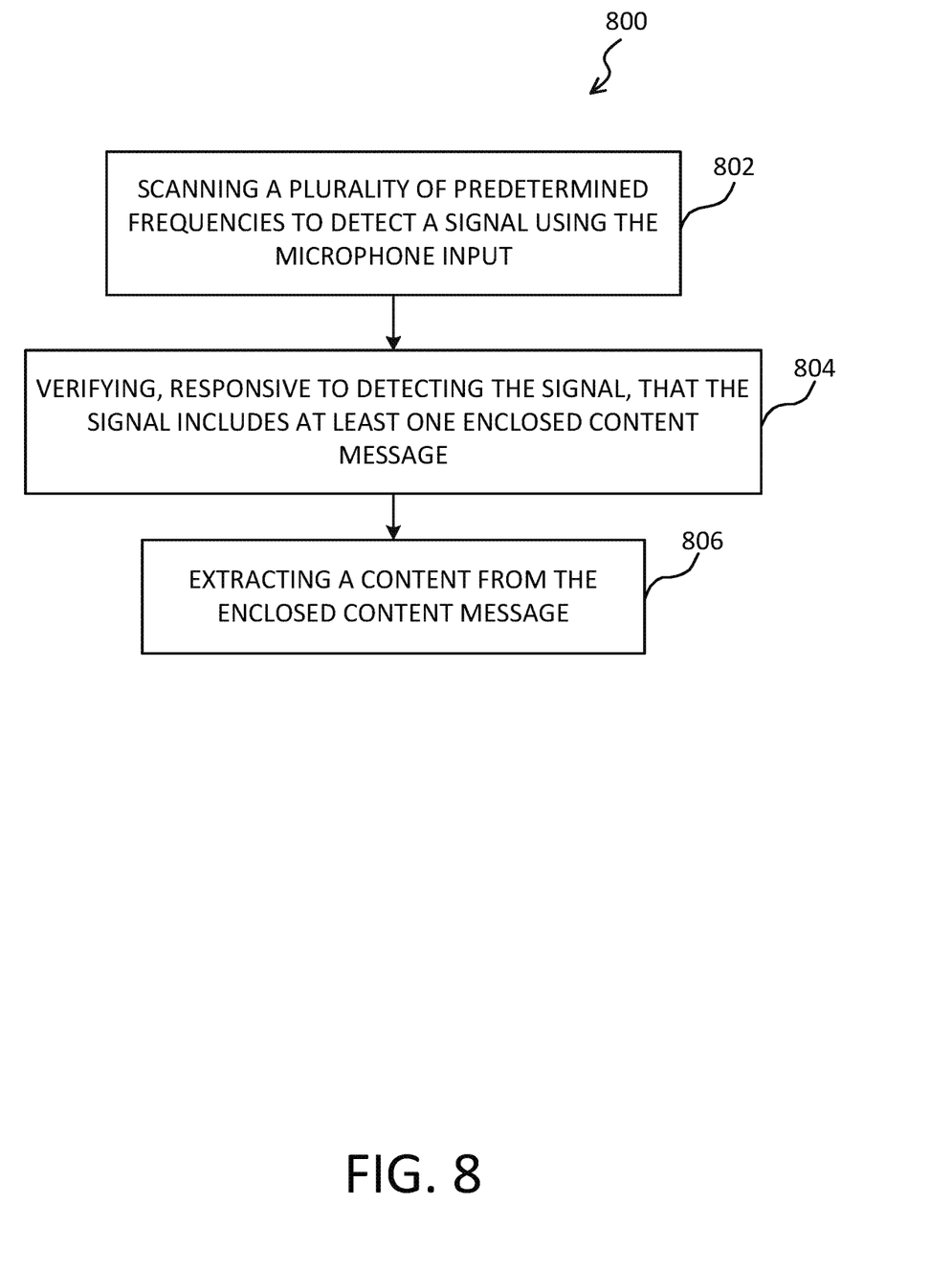
FIG. 8 is a process flow diagram showing steps for receiving an audio transmission of enclosed content data using a microphone input of a receiving computing device according to an embodiment of the present invention.

In an embodiment, a transaction flow diagram 800 as shown in FIG. 8 illustrates a near field authentication of sources using a microphone input of an audio receiving computing device 104. To facilitate appreciation and understanding of the invention, transaction flow diagram 800 is described in the context of an illustrative example of a seller seeking to sell a product at a register to a user transmitting financial data using his mobile phone. Of course the near field authentication of sources could occur for other transactions.

In step 802, the audio receiving computing device 104 scans a plurality of predetermined frequencies using a microphone input to detect a signal. For example, the register scans a plurality of predetermined frequencies to detect a signal using a microphone input of the register. The predetermined frequencies can be, for example, a set of known frequencies in which the mobile phone will be transmitting the periodic enclosed content message. Also, step 802 may commence automatically responsive to the audio receiving computing device 104 being powered on. Scanning may occur continuously, that is, the audio receiving computing device may scan all predetermined frequencies in some sequence, such that each frequency is scanned for a period $T_{SCAN}$, and that each pass across all scanned frequencies F requires a scanning period of $F \times (T_{SCAN})$. When all frequencies are scanned, the scanning may be repeated, and scanning in this manner may repeat indefinitely, to allow audio receiving computing device 104 to listen continuously for enclosed content messages.

In step 804, responsive to detecting the signal, the audio receiving computing device 104 verifies that the signal includes at least one enclosed content message. For example, responsive to detecting the signal, a near field authentication receiver logic in the register checks to ensure that there is a beginning indication and an ending indication in the signal to verify that the signal includes at least one enclosed content message. Any signal which does not include both the begin indication and the end indication will be discarded.

In step 806, the audio receiving computing device 104 extracts a content from the enclosed content message. For example, the near field authentication receiver logic in the register extracts the content from the enclosed content message. The content can include, for example, biometric data of the user, device identification data of the mobile phone, and the user's financial account information. Thus, the content can include the user's voice data, the device fingerprint of the mobile phone, and the user's credit card number.

Figure 9:
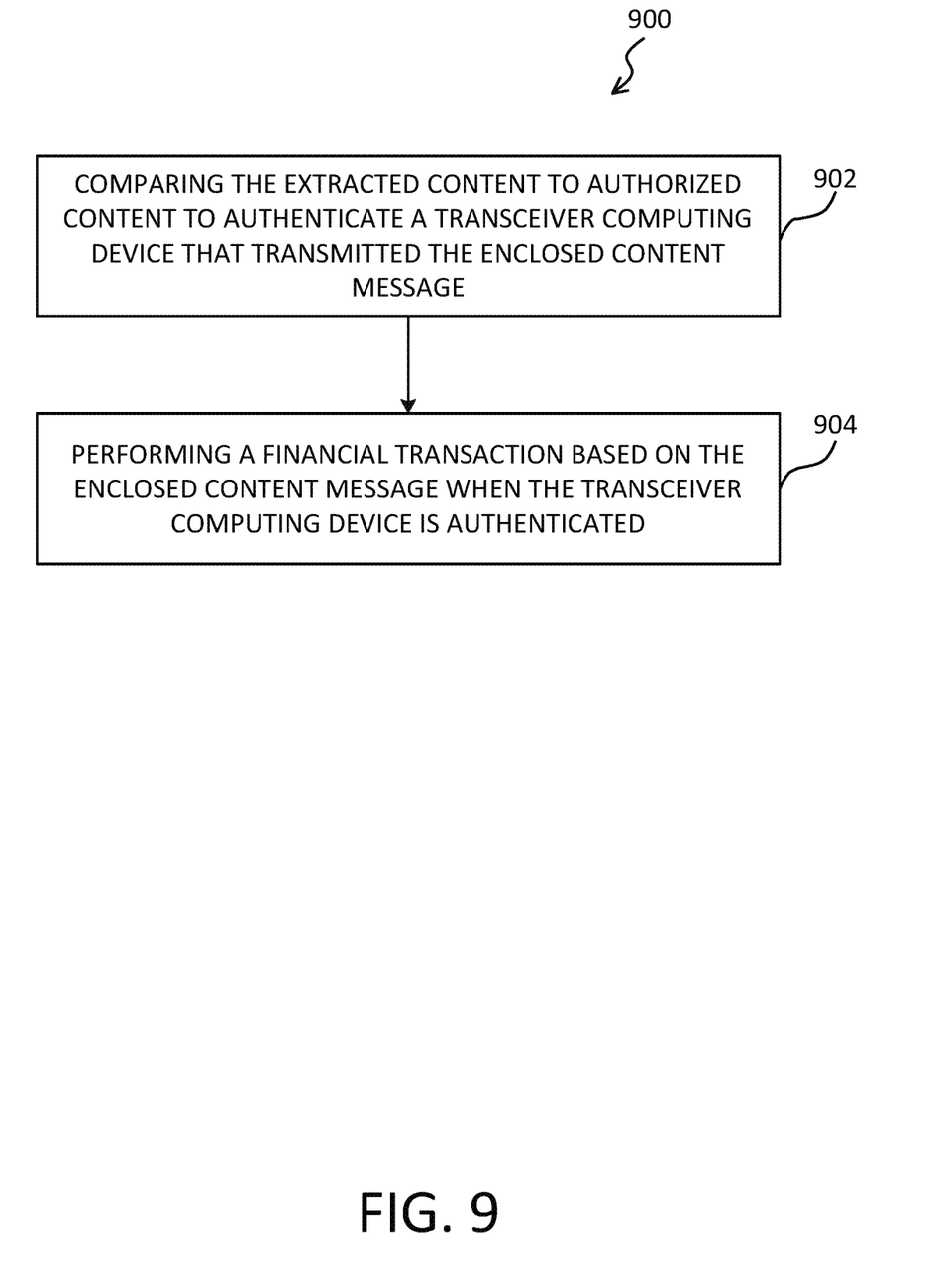
FIG. 9 depicts additional process steps for authenticating an audio transceiving device according to an embodiment of the present invention.

In an embodiment, a transaction flow diagram 900 as shown in FIG. 9 illustrates additional steps to the transactional flow diagram 800 (FIG. 8), to enhance near field authentication of sources using a microphone input of an audio receiving computing device 104.

In step 902, the audio receiving computing device 104 compares the extracted content to authorized content to authenticate a transceiver computing device 102 that transmitted the enclosed content message. For example, the near field authentication receiver logic in the register compares the extracted content to authorized content to authenticate the mobile phone that transmitted the enclosed content message. For example, the register can compare the user's voice data and the device fingerprint of the mobile phone to authenticated versions of the user's voice data and the device fingerprint of the mobile phone to authenticate the user or the mobile phone, or both.

In step 904, the audio receiving computing device 104 performs a financial transaction based on the enclosed content message when the transceiver computing device 102 is authenticated. For example, the register debits the user's financial account based on the enclosed content message when the user or the mobile phone, or both, are authenticated. Thus, the register can debit the user's financial account using the credit card number when the user or the mobile phone, or both, are authenticated.

Thus, to perform a transaction, the register need not be modified with expensive equipment. Instead, a relatively inexpensive microphone can be added to allow the register to perform the transaction using sound waves.

In an embodiment, the near field authentication of sources using audio waves can be used in conjunction with a more conventional online transaction to provide enhanced security for transactions, such as payments and electronic or personal access to confidential files or secure locations. In other words, near field authentication according to the invention may provide an additional layer of security during a more complex authentication procedure. For example, a transaction may be initiated by a user of a mobile device using an on-line log-in procedure in a first phase of authentication. If the first phase of authentication procedure is successful, the authenticating authority may require a second phase of authentication using a near-field authentication technique described herein to complete the procedure.

In another example, where secure information is large or requires additional security, it may be stored at a remote location from the audio transceiver computing device. Once multiples layers of authentication have occurred for the user or the audio transceiver computing device, or both, the audio receiver computing device can directly access, indirectly access, or receive the secure information from the remote location. Of course, such examples are only exemplary and are non-limiting as the quantity, manner, and amount of information stored remotely from the audio transceiver computing device can be varied as desired. This can also vary how the near field authentication of sources using audio waves can be used in conjunction with the conventional online transaction.

Exemplary embodiments of the invention have been disclosed in an illustrative style. Accordingly, the terminology employed throughout should be read in an exemplary rather than a limiting manner. Although minor modifications to the teachings herein will occur to those well versed in the art, it shall be understood that what is intended to be circumscribed within the scope of the patent warranted hereon are all such embodiments that reasonably fall within the scope of the advancement to the art hereby contributed, and that that scope shall not be restricted, except in light of the appended claims and their equivalents.

What is claimed is:

1. A non-transitory tangible computer readable medium useful in association with a computer that includes one or more processors and a memory, the non-transitory computer readable medium including computer instructions that are configured to cause the computer, by execution of the computer instructions in the one or more processors from the memory, to effect near field authentication of a source, the source using an audio transceiver computing device, by at least:

scanning a plurality of predetermined frequencies for a free frequency;
   selecting the free frequency from the plurality of predetermined frequencies;
   generating a periodic enclosed content message;
   generating a modulated carrier wave representing the periodic enclosed content message; and
   transmitting the modulated carrier wave at the free frequency;
   wherein each period or the periodic enclosed content message includes a begin indication, a content, and an end indication;
   wherein the content includes biometric data and a bit array, the bit array being derived from user-configurable and non-user-configurable data specific to the audio transceiver computing device; and
   wherein the modulated carrier wave comprises a sound wave.

2. The computer readable medium of claim 1 wherein the execution further comprises:

displaying a user interface on the audio transceiver computing device requesting the biometric data from a user; and
   responsive to receiving the biometric data, generating the periodic enclosed content message, wherein the content in each period of the periodic enclosed content message includes the biometric data.

3. The computer readable medium of claim 2 wherein the transmitting step further comprises transmitting the modulated carrier wave for a predetermined number of periods, or a predetermined period of time.

4. The computer readable medium of claim 2 wherein the transmitting step further comprises transmitting the modulated carrier wave until a stop indication is received from a user.

5. The computer readable medium of claim 1 wherein the transmitting step further comprises transmitting the modulated carrier wave for a predetermined number of periods, or a predetermined period of time.

6. The computer readable medium of claim 1 wherein the transmitting step further comprises transmitting the modulated carrier wave until a stop indication is received from a user.

7. The computer readable medium of claim 1 wherein the carrier wave is modulated by the periodic enclosed content message.

8. The computer readable medium of claim 1 wherein the non-user-configurable data comprises hardware component numbers, serial numbers, and version numbers.

9. A non-transitory tangible computer readable medium useful in association with a computer that includes one or more processors and a memory, the non-transitory computer readable medium including computer instructions that are configured to cause the computer, by execution of the computer instructions in the one or more processors from the memory, to effect near field authentication of a source, the source using an audio transceiver computing device, by at least:

scanning a plurality of predetermined frequencies for a free frequency;

selecting the free frequency from the plurality of predetermined frequencies;

generating a periodic enclosed content message;

generating a modulated carrier wave representing the periodic enclosed content message; and     transmitting the modulated carrier wave at the free frequency,     wherein each period of the periodic enclosed content message includes a begin indication, a content, and an end indication;

wherein the content includes device identification data including a bit array derived from user-configurable and non-user-configurable data specific to the audio transceiver computing device; and     wherein the modulated carrier wave comprises a sound wave.

10. The computer readable medium of claim 9 wherein the transmitting step further comprises transmitting the modulated carrier wave for a predetermined number of periods, or a predetermined period of time.

11. The computer readable medium of claim 9 wherein the transmitting step further comprises transmitting the modulated carrier wave until a stop indication is received from a user.

12. The computer readable medium of claim 9 wherein the carrier wave is modulated by the periodic enclosed content message.

13. A computer system comprising: at least one processor; and a non-transitory computer readable medium that is operatively coupled to the processor and stores instructions that, when executed by the processor, effect near field authentication of a source, the source using an audio transceiver computing device, by at least: scanning a plurality of predetermined frequencies for a free frequency; selecting the free frequency from the plurality of predetermined frequencies; generating a periodic enclosed content message; generating a modulated carrier wave representing the periodic enclosed content message; and transmitting the modulated carrier wave at the free frequency; wherein each period or the periodic enclosed content message includes a begin indication, a content, and an end indication; wherein the content includes biometric data and a bit array, the bit array being derived from user-configurable and non-user-configurable data specific to the audio transceiver computing device; and wherein the modulated carrier wave comprises a sound wave.

14. The computer system of claim 13 wherein the execution further comprises:

displaying a user interface on the audio transceiver computing device requesting the biometric data from a user; and     responsive to receiving the biometric data, generating the periodic enclosed content message, wherein the content in each period of the periodic enclosed content message includes the biometric data.

15. The computer system of claim 14 wherein the transmitting step further comprises transmitting the modulated carrier wave for a predetermined number of periods, or a predetermined period of time.

16. The computer system of claim 14 wherein the transmitting step further comprises transmitting the modulated carrier wave until a stop indication is received from a user.

17. The computer system of claim 13 wherein the transmitting step further comprises transmitting the modulated carrier wave for a predetermined number of periods, or a predetermined period of time.

18. The computer system of claim 13 wherein the transmitting step further comprises transmitting the modulated carrier wave until a stop indication is received from a user.

19. The computer system of claim 13 wherein the carrier wave is modulated by the periodic enclosed content message.

20. The computer system of claim 13 wherein the non-user-configurable data comprises hardware component numbers, serial numbers, and version numbers.

21. A computer system comprising: at least one processor; and a non-transitory computer readable medium that is operatively coupled to the processor and stores instructions that, when executed by the processor, effect near field authentication of a source, the source using an audio transceiver computing device, by at least: scanning a plurality of predetermined frequencies for a free frequency; selecting the free frequency from the plurality of predetermined frequencies; generating a periodic enclosed content message; generating a modulated carrier wave representing the periodic enclosed content message; and transmitting the modulated carrier wave at the free frequency, wherein each period of the periodic enclosed content message includes a begin indication, a content, and an end indication; wherein the content includes device identification data including a bit array derived from user-configurable and non-user-configurable data specific to the audio transceiver computing device; and wherein the modulated carrier wave comprises a sound wave.

22. The computer system of claim 21 wherein the transmitting step further comprises transmitting the modulated carrier wave for a predetermined number of periods, or a predetermined period of time.

23. The computer system of claim 21 wherein the transmitting step further comprises transmitting the modulated carrier wave until a stop indication is received from a user.

24. The computer system of claim 21 wherein the carrier wave is modulated by the periodic enclosed content message.

* * * * *